United States Patent
Corghi

(10) Patent No.: US 11,912,294 B2
(45) Date of Patent: Feb. 27, 2024

(54) METHOD, COMPUTER PROGRAM AND APPARATUS FOR CALIBRATING AN ADAS SENSOR OF AN ADVANCED DRIVER ASSISTANCE SYSTEM OF A VEHICLE

(71) Applicant: NEXION S.p.A., Correggio (IT)

(72) Inventor: Giulio Corghi, Correggio (IT)

(73) Assignee: NEXION S.P.A., Correggio (IT)

( * ) Notice: Subject to any disclaimer, the term of this patent is extended or adjusted under 35 U.S.C. 154(b) by 62 days.

(21) Appl. No.: 17/609,038

(22) PCT Filed: May 7, 2020

(86) PCT No.: PCT/IB2020/054313
§ 371 (c)(1),
(2) Date: Nov. 5, 2021

(87) PCT Pub. No.: WO2020/225759
PCT Pub. Date: Nov. 12, 2020

(65) Prior Publication Data
US 2022/0194399 A1    Jun. 23, 2022

(30) Foreign Application Priority Data
May 8, 2019 (IT) .................. 102019000006640

(51) Int. Cl.
*B60W 50/04* (2006.01)
*B60W 40/12* (2012.01)
(Continued)

(52) U.S. Cl.
CPC .......... *B60W 50/045* (2013.01); *B60W 40/12* (2013.01); *G01S 7/40* (2013.01);
(Continued)

(58) Field of Classification Search
CPC ................................................. G01C 15/006
See application file for complete search history.

(56) References Cited

U.S. PATENT DOCUMENTS

| | | | |
|---|---|---|---|
| 4,718,759 A | 1/1988 | Butler | |
| 7,121,011 B2 * | 10/2006 | Murray | G01B 11/2755 33/203.18 |

(Continued)

FOREIGN PATENT DOCUMENTS

| | | |
|---|---|---|
| DE | 10114799 | 10/2010 |
| EP | 1260832 A1 | 11/2002 |

(Continued)

OTHER PUBLICATIONS

International Search Report issued in International Application No. PCT/IB2020/054313 dated Jul. 17, 2020.

(Continued)

*Primary Examiner* — Michael A Berns
(74) *Attorney, Agent, or Firm* — United IP Counselors, LLC

(57) ABSTRACT

A method for calibrating an ADAS sensor of an advanced driver assistance system of a vehicle (9) comprises the following steps: (A) deriving an attitude parameter of the vehicle (9); receiving the derived attitude parameter in a control unit (11); (B) comparing the derived attitude parameter with a corresponding reference parameter; (C) aiding with the positioning of a support structure (3) near the service area (8), where a calibration device (41) is mounted on the support structure (3); sending a calibration command from the control unit (11) to an electronic control unit (95) of the vehicle (9) to determine an interaction between the ADAS sensor and the calibration device (41); processing data received from the electronic control unit (95) of the vehicle (9) in the control unit (11).

17 Claims, 5 Drawing Sheets

(51) Int. Cl.
*G01S 7/40* (2006.01)
*G01S 7/497* (2006.01)
*B60W 50/00* (2006.01)

(52) U.S. Cl.
CPC ...... *G01S 7/497* (2013.01); *B60W 2050/0083* (2013.01); *B60W 2420/42* (2013.01); *B60W 2420/52* (2013.01); *B60W 2556/45* (2020.02)

(56) References Cited

U.S. PATENT DOCUMENTS

| | | | |
|---|---|---|---|
| 10,989,625 B2* | 4/2021 | Corghi | G01M 11/061 |
| 11,465,632 B2* | 10/2022 | Corghi | G01B 11/2755 |
| 11,624,608 B2* | 4/2023 | Lawrence | G01S 7/4086 |
| | | | 701/33.1 |
| 2004/0049930 A1 | 3/2004 | Murray | |
| 2013/0325252 A1 | 12/2013 | Schommer et al. | |
| 2020/0105018 A1* | 4/2020 | Corghi | G01B 11/272 |
| 2020/0334927 A1* | 10/2020 | Rozint | G07C 5/0841 |
| 2021/0279910 A1* | 9/2021 | Corghi | G06T 7/80 |
| 2022/0003550 A1* | 1/2022 | Lai | G01C 15/004 |
| 2022/0042794 A1* | 2/2022 | Cejka | G01S 7/497 |
| 2022/0194399 A1* | 6/2022 | Corghi | B60W 40/12 |

FOREIGN PATENT DOCUMENTS

| | | |
|---|---|---|
| EP | 1016873 B1 | 12/2008 |
| EP | 2302318 B1 | 12/2014 |
| WO | 2018067354 A1 | 4/2018 |
| WO | 2018153722 A1 | 8/2018 |
| WO | 2019211756 A1 | 11/2019 |

OTHER PUBLICATIONS

Written Opinion issued in International Application No. PCT/IB2020/054313 dated Jul. 17, 2020.

* cited by examiner

METHOD, COMPUTER PROGRAM AND APPARATUS FOR CALIBRATING AN ADAS SENSOR OF AN ADVANCED DRIVER ASSISTANCE SYSTEM OF A VEHICLE

TECHNICAL FIELD

This invention relates to a method for calibrating an ADAS sensor of an advanced driver assistance system sensor of a vehicle.

In particular, the field of this application is the calibration or alignment of the vehicle's sensors such as, for example, radar sensors, LIDAR sensors, optical sensors (cameras) or other sensors used in safety systems to prevent frontal collisions, in lane detection systems, in cruising speed control systems, in safe stopping distance systems or like systems.

In the field of driver assistance systems, target units used in procedures for aligning and calibrating the sensors of advanced driver assistance systems may be mounted on trolley-like structures.

BACKGROUND ART

For example, patent document WO2018/067354A1 provides a structure used to support an optical target for calibrating a vehicle camera and a metallic target for calibrating a radar sensor of the vehicle.

Other structures used for calibrating vehicle sensors are described in patent documents DE10114799B4, EP1016873B1, U.S. Pat. No. 8,244,024B2 and WO2018/153722A1, U.S. Pat. No. 7,121,011B2, US2004/049930A1, U.S. Pat. No. 4,718,759A, WO2019/211756A1.

These structures must be positioned in front of the vehicle at a predetermined distance and oriented in a predetermined manner relative to a reference point of the vehicle. The predetermined distance and orientation are specified by the vehicle manufacturers and refer to an optimum position of the structure relative to a vehicle whose attitude values—for example, toe and camber—fall within optimum ranges (where the values are considered acceptable by the manufacturer). Thus, for the support structure to be positioned correctly relative to the vehicle, the vehicle must have optimum (or acceptable) attitude values, that is, correct values; if the vehicle's attitude values are not correct, wheel alignment must be performed in order to modify the attitude values. Consequently, before the ADAS sensors are calibrated, a procedure for checking the vehicle's wheel attitude may be necessary (a procedure which is generally carried out according to manufacturers' specifications); the procedure for checking the attitude is distinct from the procedure for calibrating the ADAS sensor, that is to say, it is carried out with a different system. For example, the procedure for checking the attitude may be carried out with the system described in patent document EP2302318B1, in the name of the present Applicant.

The distinction between the attitude checking system and the ADAS sensor calibration system means that workshops need to have two different pieces of equipment to be used in sequence. Indeed, if a workshop does not have a system for checking the attitude (as is frequently the case in auto glass repair shops) that workshop will be unable to carry out calibration of the ADAS sensors, with consequent disadvantages in terms of vehicle safety. Moreover, reducing the procedure time for calibration while at the same time ensuring that the procedure is carried out correctly is a widespread need.

Disclosure of the Invention

This disclosure has for an aim to provide a method and an apparatus for calibrating (or aligning) an ADAS sensor of an advanced driver assistance system of a vehicle to overcome at least one of the above mentioned drawbacks of the prior art.

This aim is fully achieved by the method and apparatus for calibrating (or aligning) an ADAS sensor of an advanced driver assistance system of a vehicle as characterized in the appended claims.

According to one aspect it, this disclosure relates to an apparatus for calibrating an (at least one) ADAS sensor of a vehicle. By ADAS sensor is meant a sensor forming part of an advanced driver assistance system of a vehicle. For example, the sensor to be aligned or calibrated may be a radar sensor, an optical sensor (camera), an ultrasonic sensor or a LIDAR sensor.

During execution of the steps of the method, the vehicle is preferably positioned in a service area. In order to calibrate the ADAS sensor, the method also comprises a step of a control unit aiding with the positioning of a support structure near the service area (or, in a position in front of the vehicle).

The method comprises a step of deriving an (at least one) attitude parameter of the vehicle. More specifically, the attitude parameter includes wheel alignment or characteristic wheel angles, such as toe and/or camber, for the front wheel and/or for the rear wheels. The attitude parameter is derived from the measurements taken, such as, for example, the relative position between the wheels of the vehicle or between a wheel and a reference point outside the vehicle.

In an embodiment, the method comprises a step of asking the operator to confirm starting the step of deriving the attitude parameter. Thus, in an embodiment, the step of deriving the attitude parameter is conditional upon receiving confirmation from the operator.

The method comprises a step of receiving the derived attitude parameter in a control unit. In an embodiment, the attitude parameter is derived by the control unit; in another embodiment, the attitude parameter is derived and then transmitted to the control unit.

The method comprises a step of comparing the derived attitude parameter with a corresponding (attitude) reference parameter.

In an embodiment, the method comprises a step of the control unit identifying the vehicle. The step of identifying the vehicle comprises receiving in the control unit information uniquely correlated with the vehicle (for example, type, which includes make and model). For this purpose, a user interface is provided for the operator to enter information relating to the vehicle and that information is received by the control unit as input. In addition, or alternatively, the control unit captures a code which is uniquely correlated with the vehicle (for example, the vehicle's identification code or VIN and/or the registration number or other code correlated with the make, model and owner of the vehicle. The code uniquely correlated with the vehicle can be communicated to the control unit by the operator (through an interface) or by the vehicle's electronic control unit.

In an embodiment, the method comprises a step of the control unit querying one or more databases to retrieve, as a function of the type of vehicle (that is, in response to the result of the step of identifying) data that are useful (necessary) for one or more of the steps of detecting the attitude, aiding with the positioning of the support structure (that is, of the ADAS sensor calibration device mounted on the support structure) and actually calibrating the ADAS sensor.

As regards the data that are useful (necessary) for the step of detecting the attitude, the control unit (responsive to the result of the step of identifying) queries a database to derive (retrieve) the value of the reference parameter as a function of the type of vehicle (make and/or model). The reference parameter represents a reference value for the attitude parameter. The reference parameter is provided by the vehicle manufacturer. More specifically, in an embodiment, the reference parameter represents a reference range (from a minimum value to a maximum value) for the attitude parameter; the step of comparing includes checking that the derived attitude parameter falls within the reference range. In an embodiment, the reference parameter represents a reference value and a corresponding tolerance relative to the reference value; the step of comparing includes checking that the derived attitude parameter falls within a range defined between the reference value minus the tolerance and the reference value plus the tolerance.

Preferably, it is provided that the control unit performs the step of aiding with the positioning only if the step of comparison outputs that the attitude parameter of the vehicle is within the reference range, or within the tolerance range for the reference value. So, it is provided that the control unit performs the step of aiding with the positioning only if the comparison between the attitude parameter and the reference parameter reveals that the attitude parameter is sufficiently close to the reference parameter. Otherwise, if the attitude parameter is not sufficiently close to the reference parameter, the control unit will not perform the step of aiding with the positioning, and will recommend to correct the attitude of the vehicle, until the attitude parameter will be sufficiently close to the reference parameter.

The data that are useful (necessary) for aiding with the positioning of the support structure constitute information relating to the part of the vehicle (for example, the axis of symmetry or the thrust axis, the front axle, the front logo or others still) that is to be used as positioning reference and the permitted ranges for relative positioning (with reference to distance or relative orientation, for example).

The data that are useful (necessary) for actual calibration of the ADAS sensor include information to enable the control unit to communicate with the electronic control unit of that vehicle; in effect, the control unit of the apparatus must communicate with the electronic control unit of the vehicle (so that the electronic control unit in turn drives or calibrates the ADAS sensors). Further, the control unit of the apparatus might communicate with the electronic control unit of the vehicle to capture (read) the vehicle's self-diagnosis information such as, for example, errors and status parameters or variables (this information might be used by the control unit to calibrate the ADAS sensor or to tell the electronic control unit to vary the settings of one or more status parameters or variables).

Preferably step of the control unit querying the one or more databases to retrieve the data that are useful (necessary) for all of the above mentioned steps (detecting the attitude, aiding with the positioning of the support structure and actually calibrating the ADAS sensor) is carried out in response to a single step of identifying the vehicle; in other words, the information uniquely correlated with the vehicle, obtained in the single step of identifying, are used for more than one query, that is to say, to obtain the reference data for detecting the attitude, the reference data for aiding with the positioning of the support structure and the reference data for actually calibrating the ADAS sensor.

In an embodiment, the support structure includes a grippable portion which can be held by the operator to drive the support structure manually. In this embodiment, the step of aiding with the positioning includes transmitting movement instructions to the operator through an interface (for example, in numeric form and/or with arrows).

In an embodiment, the support structure can be driven by the operator using a remote control that is operatively connected to a motion actuator (in addition or alternatively to the possibility of driving manually with the grippable portion). In this embodiment, too, the step of aiding with the positioning may include transmitting movement instructions to the operator through an interface.

In an embodiment, the support structure can be driven automatically by the control unit, which drives the motion actuator. In this embodiment, the step of aiding with the positioning includes transmitting from the control unit to the motion actuator to activate the motion actuator.

In other imaginable embodiments, the support structure can be driven either by an operator (using the grippable portion and/or with a remote control or automatically by the control unit; depending on circumstances, the operator can select two or more of the following modes: a manual mode (in which the structure is moved manually by the operator using the grippable portion), a semi-automatic mode (in which the structure is moved using the remote control) or an automatic mode (in which the control unit drives the motion actuator).

A calibration device is mounted on the support structure. The calibration device is configured to facilitate alignment or calibration of the (at least one) ADAS sensor of the vehicle. In an embodiment, the calibration device includes a target panel having a surface bearing a combination of predetermined graphical features. In this embodiment, the calibration device is configured to calibrate an ADAS camera of the vehicle.

In an embodiment, the calibration device includes a reflector having a metallic surface or a surface capable of reflecting electromagnetic waves at the frequencies at which ADAS radar sensors work. In this embodiment, the calibration device is configured to facilitate alignment or calibration of an ADAS radar sensor of the vehicle.

In an embodiment, the calibration device includes a target panel configured to calibrate a LIDAR sensor of the advanced driver assistance system of the vehicle. The target panel for calibrating a LIDAR sensor is reflective in one embodiment and retroreflective in another embodiment. In an embodiment, the calibration device includes a device configured to calibrate or align an infrared ADAS sensor.

The method comprises a step of aiding with the positioning of a support structure near the service area. The step of aiding with the positioning is performed by the control unit and in response to the comparison between the attitude parameter and the reference parameter. The support structure is positioned at a predetermined distance and oriented in a predetermined manner relative to the vehicle. More specifically, the support structure can be positioned using as a reference element the thrust axis of the vehicle, or the axis of symmetry of the vehicle, or the front logo of the vehicle or the front camera of the vehicle, or the front axle of the vehicle.

Furthermore, it is possible to apply to one or more embodiments one or more of the aspects described in Italian patent application 102018000009030 in the name of the present Applicant and incorporated herein by reference. It is expressly understood that all the features of the method and apparatus of Italian patent application 102018000009030 can be applied to the method and apparatus of these embodiments.

The method comprises a step of sending a calibration command from the control unit to an electronic control unit of the vehicle to determine an interaction between the ADAS sensor and the calibration device.

The method comprises a step of the control unit processing data received from the electronic control unit of the vehicle in order to generate calibration data. The calibration data represent a result of processing and, more generally speaking, of the calibration procedure.

Thus, this disclosure provides a single, integrated procedure for checking the attitude and calibrating the ADAS sensor.

In an embodiment, the method comprises a step of measuring (at least) an inflation pressure value of the tyres. The inflation pressure of the tyres can be measured through TPMS sensors (Tyre Pressure Monitoring Systems) that can be mounted on the wheels, and/or through electronic measurement devices.

In an embodiment, the method comprises a step of detecting (one or more) identification information relative to the tyre (for example, dimensions, brand, model, and/or a photo of a side of the tyre). In an embodiment, the method comprises a step of taking a photo of the vehicle (possibly, together with the support structure and the calibration device, being positioned near the service area, and/or a calibration setup). In an embodiment, the method comprises a step of reading the vehicle number plate (for example, the vehicle number plate can be red on the photo of the vehicle); the method can further comprise associating the vehicle number plate to data relative to the vehicle stored in a database.

In an embodiment, the method comprises a step of generating a report document. Preferably, the report document includes one or more values for the derived attitude parameter. In an embodiment, the report document includes the calibration data and, preferably, an identification code of the vehicle. The report document may also include one or more of the following information items: identification code of the tool used to derive the attitude parameter, identification code of the tool used to perform calibration (that is, of the calibration device), version of the software of the control unit, result of an attitude checking procedure; identification data of the workshop where calibration is performed; identification data of the operator; customer (vehicle owner) data; inflation pressure value(s) of the tyre(s) which have been measured; identification information relative to the tyre (for example, dimensions, brand, model); photo of the vehicle; photo of the calibration setup; data relative to the vehicle taken from the database; time instant (date and time) at which calibration is completed.

In one embodiment in particular, the report document includes one or more values for the derived attitude parameter and/or the calibration data and/or one or more of the information items listed above, associated with the time instant at which they were derived or generated. In an embodiment, the report document comprises a history of the calibrations performed, the history including a plurality of records, where each record includes a plurality of derived attitude parameters and/or a plurality of calibration data items and/or one or more of the information items listed above, where each record is associated with the time instant at which the calibration was performed.

In an embodiment, the method comprises a step of printing the report document. More specifically, the report document can be printed in alphanumeric characters, and/or in the form of a barcode, and/or in the form of a QR code. Generally speaking, the method may include a step of generating a file containing the report document. In an embodiment, the method includes a step of saving the file to a server and/or to a cloud. In an embodiment, the method includes a step of sending the report document to the customer (for example by email or to a smartphone application).

In one embodiment, the method comprises a step of determining a thrust axis of the vehicle from the attitude parameter (specifically from the value of toe of the rear wheels). In this embodiment, the support structure can be positioned relative to the vehicle using as reference the vehicle's thrust axis determined. Hence, in an embodiment, the positioning of the support structure is based on the derived attitude parameter.

In an embodiment, the method comprises a step of generating an alert signal as a function of a deviation between the derived attitude parameter and the corresponding reference value for the attitude parameter. More specifically, the alert signal is generated if the derived attitude parameter is outside the predetermined range for the attitude parameter. The alert signal is transmitted to the operator to recommend changing the attitude parameter values and/or to ask the owner of the vehicle for authorization to proceed to changing the attitude parameter values.

In an embodiment, the method comprises a step of generating an attitude correct signal as a function of a deviation between the derived attitude parameter and the corresponding reference value for the attitude parameter. More specifically, the attitude correct signal is generated if the derived attitude parameter is within the predetermined range for the attitude parameter. The attitude correct signal can be transmitted to the operator to proceed to calibration. In an embodiment, the attitude correct signal is recorded in the report document to certify the correct value/values of the derived attitude parameter/parameters. The attitude correct signal can also be transmitted to a third party—for example, an insurance authority—to document the correct value/values of the derived attitude parameter/parameters.

In an embodiment, aiding with the positioning of the support structure incudes a step of generating movement instructions as a function of a deviation between the derived attitude parameter and the corresponding reference value for the attitude parameter. Hence, in a possible example embodiment, if the derived attitude parameter deviates significantly from the corresponding reference parameter (that is, if it is outside the predetermined range), the position of the support structure can be modified to compensate for the deviation of the attitude parameter from the corresponding reference parameter. When the structure is driven by the operator, manually or with the remote control, the movement instructions are transmitted to the operator as an aid for further movement of the support structure. In addition, when the structure is driven automatically by the control unit, the movement instructions are transmitted to the motion actuator which moves the support structure.

In an embodiment, the method comprises a step of selecting the reference element relative to which the support structure is positioned, chosen from a plurality of reference elements as a function of the comparison between the derived attitude parameter and the reference parameter. Said plurality of reference elements may include two or more of the following elements: thrust axis of the vehicle, symmetry axis of the vehicle, front logo of the vehicle, front camera of the vehicle, front axle of the vehicle. In fact, when the attitude parameter deviates from the reference parameter by an amount such that the reference element to which the manufacturer's specifications refer cannot be exactly determined, a second reference element is used. More specifically, in an embodiment, the method comprises a step of querying a database to retrieve a geometrical relation from the reference element specified by the manufacturer and the second reference element, in order to derive a reference position of the support structure relative to the second reference element of the vehicle, as described in Italian patent application 102019000001171 in the name of the present Applicant and incorporated herein by reference. It is expressly understood that all the features of the method and apparatus of Italian patent application 102019000001171 can be applied to the method and apparatus of this embodiment.

The step of identifying is preferably single, that is to say, it is carried out once only (each time the calibration method is run); when the method is run on another vehicle or, after a long time, on the same vehicle, the step of identifying is repeated; but the step of identifying is not carried out separately, which means it is carried out for the attitude check and not repeated for ADAS calibration, where checking the attitude is also functional to ADAS calibration. More specifically, the step of identifying is carried out before the step of deriving the attitude parameter of the vehicle. Thus, this disclosure provides a method for checking the attitude and calibrating the ADAS sensor in a particularly quick and efficient manner, where vehicle identification is carried out once only (and need not be repeated) both for checking the attitude and for calibrating the ADAS sensor.

This disclosure also provides a computer program comprising operating instructions configured to perform the steps of the method of this disclosure, when run on a computer. Thus, this disclosure provides an integrated computer program (software) configured to allow checking at least one attitude parameter of the vehicle, to aid with the positioning of the structure relative to the vehicle and also to communicate with the electronic control unit of the vehicle to perform calibration of an ADAS sensor of the vehicle. This integrated procedure is faster and safer because calibration is based on the attitude parameter values derived just a few seconds earlier; in effect, it minimizes the risk of varying the attitude parameter values by moving the vehicle from the area where the attitude is checked to another area where the ADAS sensors are calibrated; also minimized is the risk that any errors made by the operator when checking the attitude have a negative influence on the calibration of the ADAS sensors.

As regards the procedure for deriving the attitude parameter, different methods are imaginable.

In one or more embodiments, the attitude parameter can be derived using cameras to view targets associated with the wheels of the vehicle. In an embodiment, the cameras are positioned on a movable device (on wheels or rails running alongside the service area parallel to the thrust axis of the vehicle); the movable reference device in turn views a fixed reference target. In particular, the attitude parameter can be derived with the procedure described in patent document EP2302318B1, in the name of the present Applicant and incorporated herein by reference. It is expressly understood that all the features of the apparatus of patent document EP2302318B1 can be applied to this embodiment of the method described herein.

In an embodiment, the cameras are positioned on a fixed device; in particular, the attitude parameter can be derived with the procedure described in patent document EP3084348B1, in the name of the present Applicant and incorporated herein by reference. It is expressly understood that all the features of the apparatus of patent document EP3084348B1 can be applied to this embodiment of the method described herein.

In an embodiment, the cameras include two pairs of cameras connected in a stereo configuration; in particular, the attitude parameter can be derived with the procedure described in patent document EP1717547B1, in the name of the present Applicant and incorporated herein by reference. It is expressly understood that all the features of the apparatus of patent document EP1717547B1 can be applied to this embodiment of the method described herein.

In one or more embodiments, the attitude parameter can be derived by interaction between measuring heads associated with the wheels of the vehicle. In particular, in an embodiment, before the step of deriving at least one attitude parameter of the vehicle, the method includes a step of positioning a first pair of measuring heads on respective front wheels of the vehicle and a step of positioning a second pair of measuring heads on respective rear wheels of the vehicle. The measuring heads of the first and second pair of measuring heads each include an emitter and/or a receiver. In this embodiment, in the step of deriving, the at least one attitude parameter is derived by the control device through communication of the control device connected to the control unit with the measuring heads of the first and second pair of measuring heads.

For these emitters/receivers of the measuring heads, different technological solutions may be used: for example, CCD and/or laser and/or LED. More specifically, in an embodiment, LED emitters and CCD receivers are used.

The measuring heads of the first and second pair of measuring heads each include a first and a second end. the first and second ends are each provided with a receiver and/or an emitter, configured to come into communication with a corresponding emitter or receiver of another measuring head. During the step of deriving the attitude parameter, the measuring heads of the first pair are operatively mounted on the front wheels in such a way as to view (detect) each other; similarly, during the step of deriving the attitude parameter, the measuring heads of the second pair are operatively mounted on the rear wheels in such a way as to view (detect) each other; furthermore, each measuring head of the first pair views (detects) a corresponding head of the second pair (positioned on the same side of the vehicle).

In an embodiment, the step of positioning the support structure includes communication between a control device, connected to the control unit, and the measuring heads of the first or the second pair of measuring heads, associated with the vehicle, and corresponding measuring heads associated with the support structure (each comprising an emitter and/or a receiver). More specifically, the control device sequentially polls the individual measuring heads (for example, through a radio communication with proprietary protocol) and communicates to the control unit the data received from the measuring heads in response (for example, via Bluetooth or Wi-Fi or through a USB port).

In effect, the first and/or the second pair of measuring heads—when they are connected to the structure and to the vehicle in such a way that the heads (of the first and the second) pair of measuring heads view (detect) each other—the heads of the corresponding pair of heads mounted on the support structure detect (view) each other and each head mounted on the vehicle detects a corresponding head mounted on the support structure (and vice versa, each head mounted on the support structure detects a corresponding head mounted on the vehicle).

More specifically, after the step of detecting, the method comprises a step of moving the first pair of measuring heads on the support structure (to define the corresponding pair of heads associated with the support structure); next, the step of positioning the support structure includes a step of the measuring heads of the first pair of measuring heads mounted on the support structure detecting the second pair of measuring heads associated with the vehicle (specifically, with the rear wheels thereof), and/or vice versa. Hence, the measuring heads polled by the control device transmit data to the control device as a function of these detections. The detections performed by the measuring heads are thus used to provide aid with positioning.

In another embodiment, the corresponding measuring heads associated with the support structure (and used to perform positioning) are additional to the first and second pair of measuring heads (used to measure the attitude parameter).

In the variant embodiments where the attitude parameter is measured using measuring heads which can later be used to position the support structure, the method is extremely practical and fast; moreover, with the measuring heads, the system for deriving the attitude parameter is at once very precise and compact.

This disclosure also provides an apparatus configured to implement the steps of the method according to one or more aspects of the disclosure.

BRIEF DESCRIPTION OF DRAWINGS

These and other features will become more apparent from the following detailed description of a preferred, non-limiting embodiment, illustrated by way of example in the accompanying drawings, in which.

DETAILED DESCRIPTION OF PREFERRED EMBODIMENTS OF THE INVENTION

Figure 1:
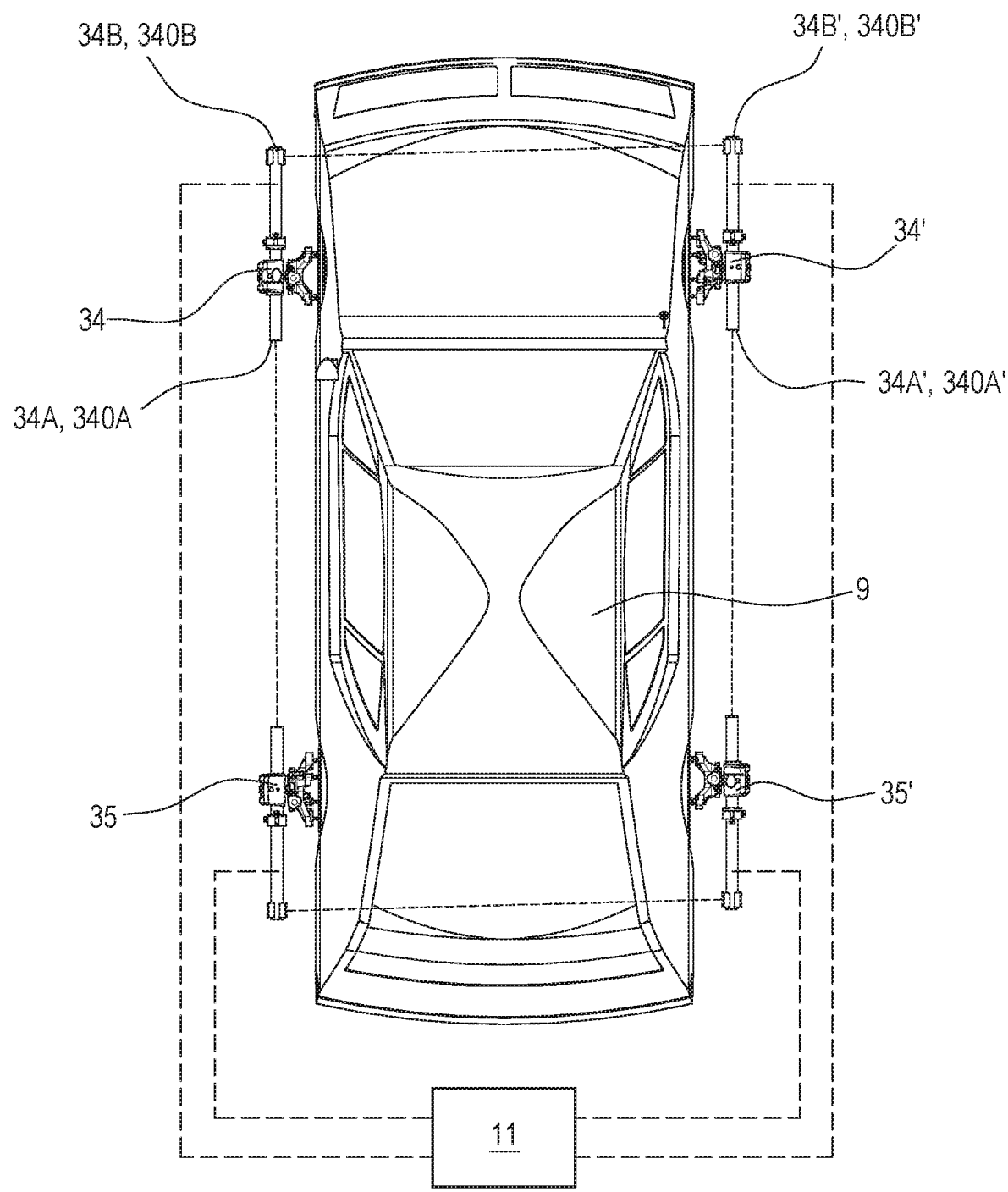
FIGS. 1 and 2 are a top view and a perspective view of a vehicle during a step of deriving an attitude parameter in the context of the method according to this disclosure.
Figure 2:
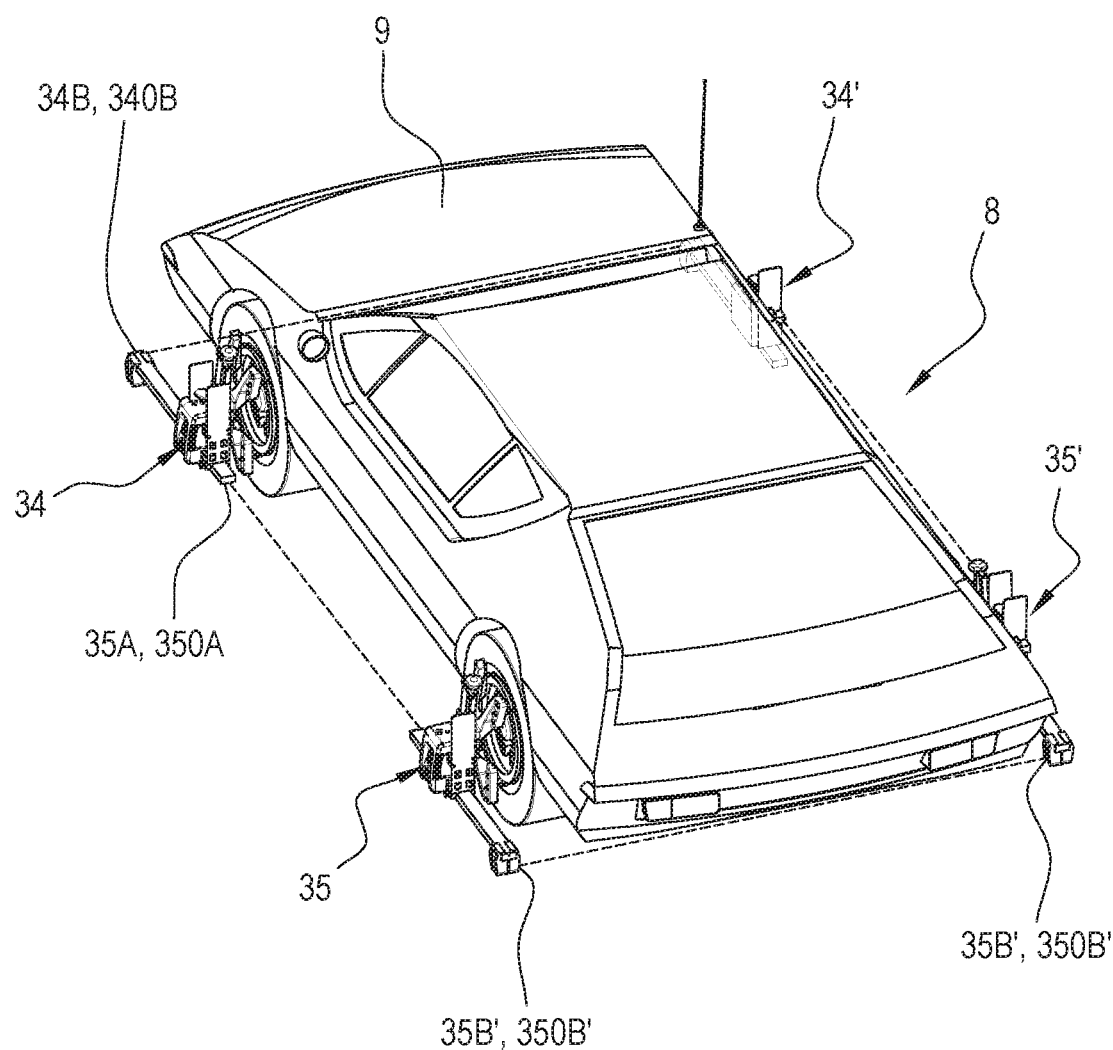
Figure 3:
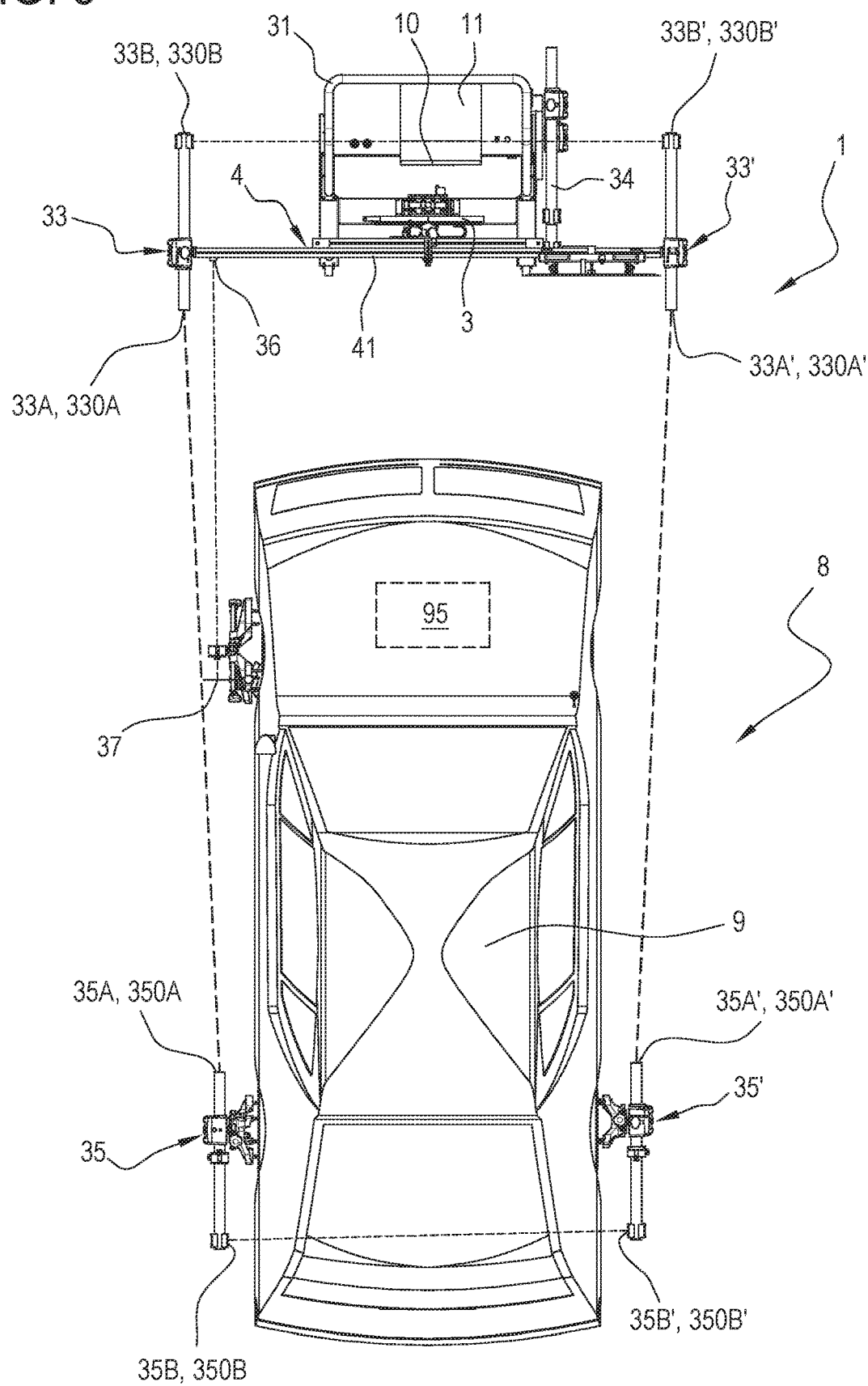
FIGS. 3 and 4 are a top view and a perspective view of a vehicle during a step of calibrating an ADAS sensor in the context of the method according to this disclosure.
Figure 4:
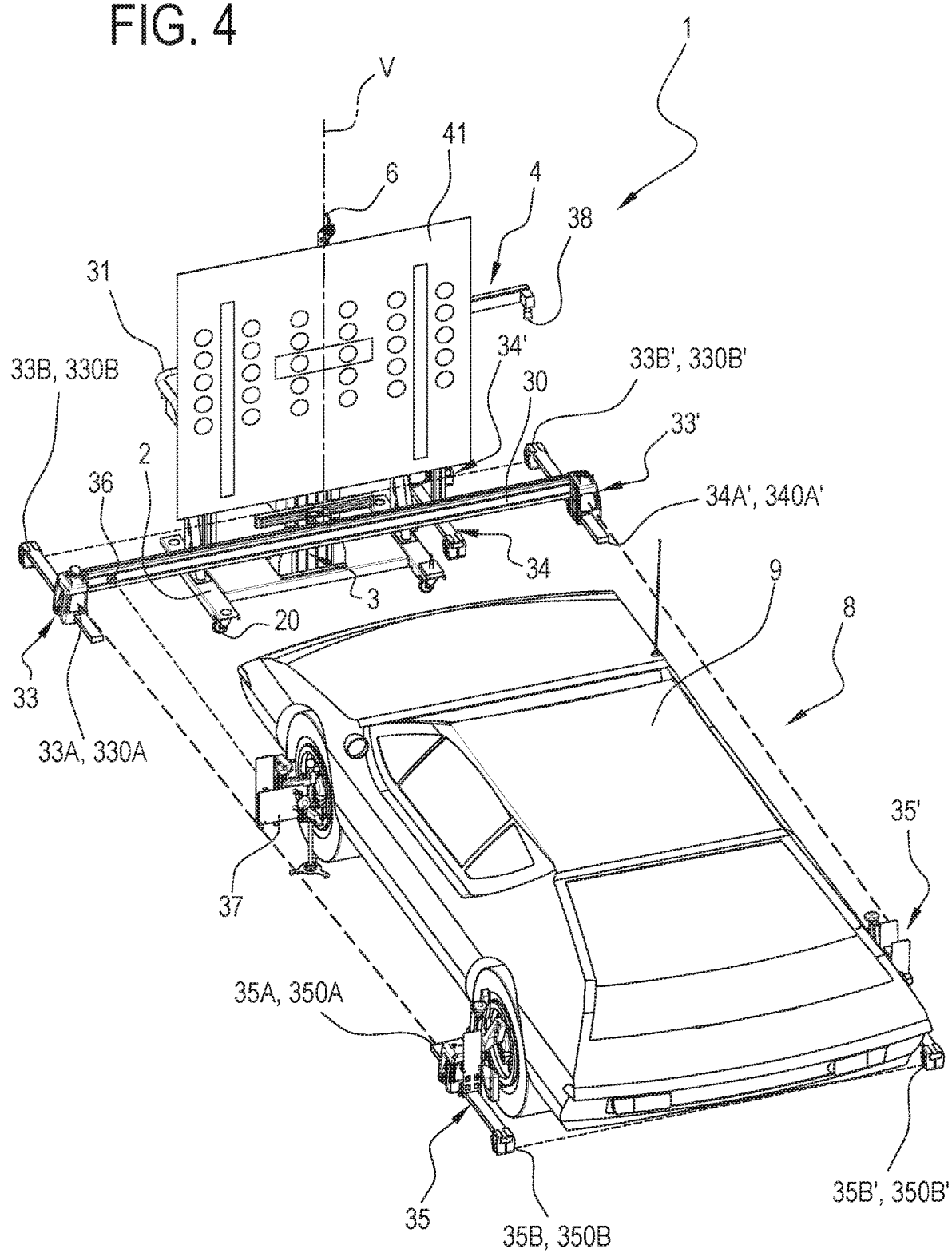
Figure 5:
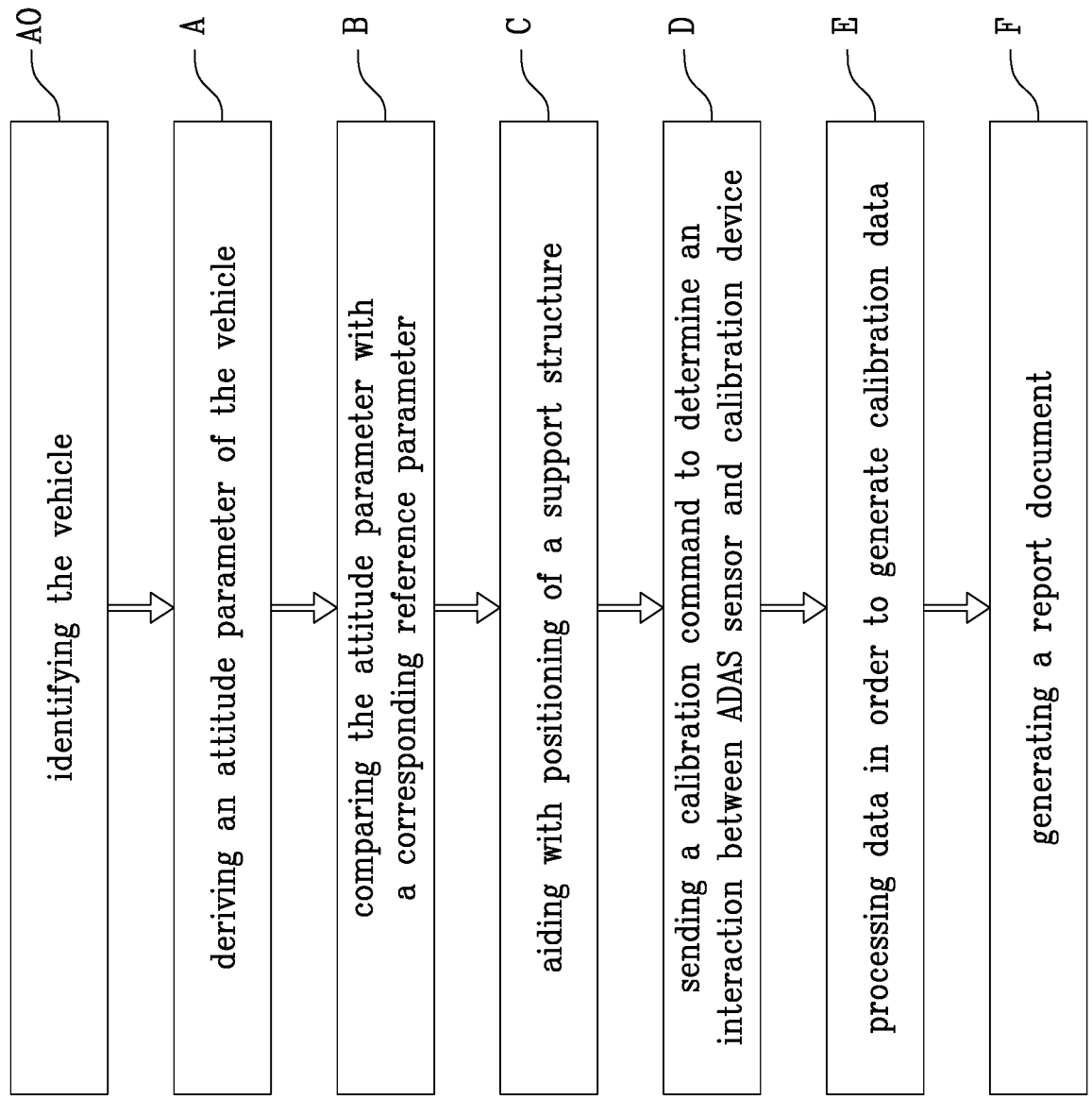
FIG. 5 schematically illustrates the method for calibrating an ADAS sensor according to this disclosure.

According to one aspect of it, this disclosure relates to a method for calibrating an ADAS sensor of an advanced driver assistance system of a vehicle 9, when the vehicle 9 is positioned in a service area 8.

According to a further aspect of it, this disclosure relates to an apparatus 1 for calibrating an ADAS sensor of an advanced driver assistance system of a vehicle 9. More specifically, according to one aspect of this disclosure, the method is implemented by the apparatus 1.

The method comprises a step A0 of a control unit 11 identifying the vehicle 9. More specifically, the control unit receives an identification code of the vehicle 9. This step A0 of identifying is preferably carried out once only, before the steps described hereinafter.

The method comprises a step A of deriving an attitude parameter of the vehicle 9.

The apparatus 1 comprises a first pair of measuring heads 34, 34'.

The apparatus 1 comprises a second pair of measuring heads 35, 35'.

The method comprises, before the step A of deriving the attitude parameter of the vehicle 9, a step of positioning the first pair of measuring heads 34, 34' on respective front wheels of the vehicle 9.

The method comprises, before the step A of deriving the attitude parameter of the vehicle 9, a step of positioning the second pair of measuring heads 35, 35' on respective rear wheels of the vehicle 9. More specifically, each of the measuring heads 34, 34', 35, 35' of the first and second pair is fixed to a bracket which is in turn fixed to a respective rim of a respective wheel of the vehicle 9.

During the step A of deriving the attitude parameter, the first pair of measuring heads 34, 34' is associated with the front wheels of the vehicle 9 and the second pair of measuring heads 35, 35' is associated with the respective rear wheels of the vehicle 9.

The measuring heads 34, 34' of the first pair each include a first emitter 34A, 34A'. Operatively, (during the step A of deriving the attitude parameter) the first emitter 34A, 34A' of each head 34, 34' of the first pair faces towards a respective head 35, 35' of the second pair. The measuring heads 34, 34' of the first pair each include a first receiver 340A, 340A'. Operatively, (during the step A of deriving the attitude parameter) the first receiver 340A, 340A' of each head 34, 34' of the first pair faces towards a respective head 35, 35' of the second pair. The first emitter 34A, 34A' and the first receiver 340A, 340A' of each head 34, 34' of the first pair thus face the same direction (substantially parallel to the thrust axis of the vehicle).

The measuring heads 34, 34' of the first pair each include a second emitter 34B, 34B'. Operatively, (during the step A of deriving the attitude parameter) the second emitter 34B, 34B' of each head 34, 34' of the first pair faces towards the other head 34, 34' of the first pair. The measuring heads 34, 34' of the first pair each include a second receiver 3406, 3406'. Operatively, (during the step A of deriving the attitude parameter) the second receiver 3406, 3406' of each head 34, 34' of the first pair faces towards the other head 34, 34' of the first pair. The second emitter 34B, 34B' and the second receiver 3406, 3406' of each head 34, 34' of the first pair thus face the same direction (transverse to the thrust axis of the vehicle).

The measuring heads 35, 35' of the second pair each include a first emitter 35A, 35A'. Operatively, (during the step A of deriving the attitude parameter) the first emitter 35A, 35A' of each head 35, 35' of the second pair faces towards a respective head 34, 34' of the first pair. The measuring heads 35, 35' of the second pair each include a first receiver 350A, 350A'. Operatively, (during the step A of deriving the attitude parameter) the first receiver 350A, 350A' of each head 35, 35' of the second pair faces towards a respective head 34, 34' of the first pair. The first emitter 35A, 35A' and the first receiver 350A, 350A' of each head 35, 35' of the second pair thus face the same direction (substantially parallel to the thrust axis of the vehicle).

The measuring heads 35, 35' of the second pair each include a second emitter 35B, 35B'. Operatively, (during the step A of deriving the attitude parameter) the second emitter 35B, 35B' of each head 35, 35' of the second pair faces towards the other head 35, 35' of the second pair. The measuring heads 35, 35' of the second pair each include a second receiver 350B, 350B'. Operatively, (during the step A of deriving the attitude parameter) the second receiver 350B, 350B' of each head 35, 35' of the second pair faces towards the other head 35, 35' of the second pair. The second emitter 35B, 35B' and the second receiver 350B, 350B' of each head 35, 35' of the second pair thus face the same direction (transverse to the thrust axis of the vehicle).

Thus, each head 34, 34' of the first pair views both the other head 34, 34' of the first pair and a corresponding head 35, 35' of the second pair; this defines a quadrangle between the measuring heads 34, 34', 35, 35, 35'.

After (or at the same time as) the step A of deriving the attitude parameter, the method comprises a step of receiving the derived attitude parameter in the control unit 11. In an embodiment, the control unit 11 is connected to the measuring heads 34, 34', 35, 35' to derive the attitude parameter of the vehicle 9.

The method then comprises a step B, through the control unit 11, of comparing the derived attitude parameter with a corresponding reference parameter representing a reference value for the attitude parameter of the vehicle. The attitude parameter depends on the vehicle; in an embodiment, the method includes a step of querying the database as a function of the vehicle identified (make and model) to retrieve the reference value for the attitude parameter for that vehicle.

The method comprises a step C of aiding with the positioning of a support structure 3 near the service area 8. The control unit 11 starts the step C of aiding with the positioning in response to the step B of comparing. More specifically, if the derived attitude parameter is sufficiently near the corresponding reference parameter, the control unit 11 starts the step C of aiding with the positioning.

The step C of aiding with the positioning includes a step of generating movement instructions. In an embodiment, the movement instructions depend on (are a function of) a deviation between the derived attitude parameter and the corresponding reference value for the attitude parameter. More specifically, in an embodiment, if the deviation is greater than a first threshold value, the control unit 11 does not start the step C of aiding with the positioning, if the deviation is not greater than the first threshold value but is greater than a second threshold value (lower than the first), the control unit 11 starts the step C of aiding with the positioning but corrects the predetermined position specified by the manufacturer to compensate for the deviation.

In an embodiment, in the step C of aiding with the positioning, the control unit 11 guides the operator in positioning the support structure 3 near the service area 8. More specifically, the apparatus 1 comprises an interface 10 connected to the control unit 11. In an embodiment, the interface 10 is positioned on the support structure 3. Hence, the operator views the interface 10 while driving the support structure 3 using the grippable portion 31. The control unit 11 transmits the movement instructions to the interface 10 to aid the operator with positioning. Thus, the method includes a step of aiding with the positioning of the support structure 3 near the service area 8 at a position in front of the vehicle 9.

According to an aspect of this disclosure, the support structure 3 forms part of the apparatus 1.

The support structure 3 comprises a mobile base unit 2. The base unit 2 includes a plurality of wheels 20. The wheels 20 of the plurality rotate or are rotatable about respective axes of rotation. The wheels 20 also swivel about respective swivel axes, oriented perpendicularly to the respective axes of rotation. The swivel axis of each wheel is at right angles (or substantially at right angles) to the respective axis of rotation. The expression at right angles or substantially at right angles is used to mean an inclination between 80° and 100°, preferably between 85° and 110° and, still more preferably, 90°. Preferably, the swivel axis is oriented along a vertical direction, parallel to the weight force (or along a substantially vertical direction). In an embodiment, the base unit 2 comprises an (at least one) stabilizer foot which is movable between a raised position and a lowered position. The stabilizer foot may be moved by hand or through actuators controlled by the operator or by the processing unit. When the support structure 3 is being moved, the foot is kept in the raised position; when the support structure 3 reaches a predetermined distance (once the step C of aiding with the positioning has been completed), the foot is lowered so as to hold the base unit 2 in place.

The stabilizer foot, at the lowered position, may also serve as a pivot for rotating the support structure 3.

In an embodiment, the stabilizer foot includes a locking device configured to lock the foot at the lowered position (or at the raised position).

The apparatus 1 comprises a vehicle calibration assistance structure 4. The vehicle calibration assistance structure 4 is mounted on the support structure 3.

In an embodiment, the vehicle calibration assistance structure 4 includes a calibration device 41. In an embodiment (illustrated), the calibration device 41 includes (or is defined by) a target panel bearing predetermined graphical features to perform (or assist with the performance of) calibration of an ADAS sensor (specifically, a camera) of the vehicle 9.

In an embodiment (not illustrated), the calibration device 41 includes (or is defined by) a reflector. The reflector is capable of reflecting electromagnetic waves for performing (or assisting with the performance of) calibration of an ADAS sensor (specifically a radar sensor) of the vehicle 9.

In an embodiment, the vehicle calibration assistance structure 4 includes a carriage which is slidably coupled to the support structure 3. More specifically, the carriage is slidable in a vertical direction V to adjust the vehicle calibration assistance structure 4 in height relative to the support structure 3. Thus, in an embodiment, the step C of aiding with the positioning includes a step of adjusting the calibration assistance structure 4 (that is, the calibration device 41) along the vertical direction. In an embodiment, the apparatus 1 includes a height distance meter 38 mounted on the vehicle calibration assistance structure 4 and directed towards the floor the base unit 2 rests on in order to measure the height of the vehicle calibration assistance structure 4 from the floor. In an embodiment, during the step C of aiding with the positioning, the control unit 11 communicates with (receives data from) the height distance meter 38.

In an embodiment, the vehicle calibration assistance structure 4 is tiltable relative to the support structure 3 (about a vertical tilting axis), to vary the orientation of the vehicle calibration assistance structure 4 relative to the support structure 3.

In an embodiment, the apparatus 1 comprises an optical projection system which includes a laser emitter 6. The laser emitter 6 is configured to project a laser blade or laser beam on the vehicle 9 which is positioned in the service area 8. The laser emitter 6 is positioned at the top of the target panel 41 and is centred along the vertical direction V.

The support structure 3 includes a grippable portion 31, which is configured to allow (or make it easier for) the operator to grip it with at least one hand.

In an embodiment, the apparatus 1 includes a further pair of measuring heads 33, 33' associated with the support structure 3 (preferably at opposite ends of a horizontal bar 30 of the support structure 3, oriented perpendicularly to the vertical direction).

The measuring heads 33, 33' each include a first emitter 33A, 33A'. Operatively, the first emitter 33A, 33A' of each head faces a respective head 35, 35' of the second pair, mounted on the rear wheels. The measuring heads 33, 33' each include a first receiver 330A, 330A'. Operatively, the first receiver 330A, 330A' faces the respective head 35, 35' of the second pair, mounted on the rear wheels.

The measuring heads 33, 33' each include a second emitter 33B, 33B'. Operatively, the second emitter 33B, 33B' of each head 33, 33' faces the other head 33, 33', associated with the support structure. The measuring heads 33, 33' each include a second receiver 3506, 3506'. Operatively (that is, when the step C of aiding with the positioning has been completed), the second emitter 33B, 33B' of each head 33, 33' faces the other head 33, 33', associated with the support structure.

In an embodiment (not illustrated), the further pair of measuring heads 33, 33' is defined by (or coincides with) the first pair of measuring heads 34, 34'; in another embodiment (illustrated), the further pair of measuring heads 33, 33' is distinct from the first pair of measuring heads 34, 34'.

In an embodiment, the method comprises, after the step A of deriving the at least one attitude parameter, a step of moving the first pair of measuring heads 34, 34' from the front wheels to the support structure 3. More specifically, in an embodiment, the measuring heads 34, 34' are moved from the front wheels to respective ends of the horizontal bar 30 of the support structure 3 (to define the further pair of measuring heads 33, 33'). In an embodiment, the measuring heads 34, 34' are moved from the front wheels to a rest position on the support structure 3 (which includes a further pair of measuring heads 33, 33' fixed to the ends of the horizontal bar 30 to aid with the positioning of the support structure 3).

In an embodiment, during the step C of aiding with the positioning, the control unit 11 also communicates with (receives data from) a distance meter 36 mounted on the support structure 3 (specifically on the horizontal bar 30). The distance meter 36 detects a positioning target element 37 mounted on a wheel of the vehicle 9 (preferably a front wheel). In effect, after moving the measuring heads 34, 34' of the first pair onto the support structure 3, a positioning target element 37, having a surface that is visible to the distance meter 36, is mounted on at least one front wheel of the vehicle 9.

The method comprises (after positioning the support structure 3 near the service area 8, at a position in front of the vehicle 9), a step D of sending a calibration command from the control unit 11 to an electronic control unit 95 of the vehicle 9 to determine an interaction between the ADAS sensor and the calibration device 41. More specifically, in response to the calibration command, the ADAS sensor views (detects) the calibration device 41 and, by communicating with the electronic control unit 95, is calibrated. This procedure constitutes a calibration or self-diagnosis.

The method comprises a step of transmitting data from the electronic control unit 95 to the control unit 11 (as a function of what the ADAS sensor views in response to the calibration command).

The method comprises a step E of the control unit 11 processing the data received from the electronic control unit 95 of the vehicle 9 in order to generate calibration data relating to a result of the calibration of the ADAS sensor.

In an embodiment, the method comprises a step of communicating to the operator, through the interface 10, one or more data items received from the electronic control unit 95 of the vehicle 9 (for example, the data relating to a horizontal or vertical deviation of the ADAS sensor relative to the target panel or to the vehicle).

The method comprises a step F of generating a report document. The report document includes the identification code of the vehicle, the attitude parameter and the calibration data.

The invention claimed is:

1. A method for calibrating an ADAS sensor of an advanced driver assistance system of a vehicle, wherein the vehicle is positioned in a service area, the method comprising the following steps:
   deriving an attitude parameter of the vehicle;
   receiving the attitude parameter in a control unit;
   comparing, through the control unit, the attitude parameter with a corresponding reference parameter representing a reference value for the attitude parameter;
   aiding with the positioning, through the control unit which is responsive to the step of comparing the attitude parameter with the reference parameter, of a support structure near the service area, where a calibration device is mounted on the support structure;
   sending a calibration command from the control unit to an electronic control unit of the vehicle to determine an interaction between the ADAS sensor and the calibration device;
   processing data received from the electronic control unit of the vehicle in through a processor of the control unit in order to generate calibration data;
   wherein, before the step of deriving the attitude parameter of the vehicle, the method includes a step of positioning a first pair of measuring heads on respective front wheels of the vehicle and positioning a second pair of measuring heads on respective rear wheels of the vehicle, where the measuring heads of the first pair and of the second pair of measuring heads each include an emitter and/or a receiver, wherein in the step of deriving the attitude parameter of the vehicle, the attitude parameter is derived by the control unit through communication between a control device, connected to the control unit, and the measuring heads of the first pair of measuring heads and of the second pair of measuring heads;
   wherein the step of aiding with the positioning of the support structure includes communication between the control device and the measuring heads of the first pair and of the second pair of measuring heads, positioned on the respective front and rear wheels of the vehicle, and corresponding measuring heads positioned on the support structure; and
   wherein, after the step of deriving the attitude parameter of the vehicle, the method comprises a step of moving the first pair of measuring heads onto the support structure, wherein the step of aiding with the positioning of the support structure includes communication between the control device and the measuring heads of the first pair of measuring heads moved onto the support structure, and the second pair of measuring heads positioned on the vehicle.

2. The method according to claim 1, comprising a step of generating a report document, where the report document includes one or more values for the attitude parameter.

3. The method according to claim 2, wherein the report document includes the calibration data and an identification code of the vehicle.

4. The method according to claim 1, comprising a step of determining a thrust axis of the vehicle from the attitude parameter, where the positioning of the support structure relative to the vehicle is performed with reference to the thrust axis determined.

5. The method according to claim 1, comprising a step of generating an alert signal as a function of a deviation between the derived attitude parameter and the corresponding reference parameter for the attitude parameter.

6. The method according to claim 1, wherein the step of aiding with the positioning of the support structure includes a step of generating movement instructions as a function of a deviation between the attitude parameter and the corresponding reference parameter for the attitude parameter.

7. The method according to claim 1, wherein the step of aiding with the positioning of the support structure is performed with reference to a reference element of the vehicle, where the method comprises a step of selecting the reference element from a plurality of reference elements as a function of the step comparing the attitude parameter with the reference parameter.

8. The method according to claim 7, wherein the reference element is selected among two or more of the following elements: thrust axis of the vehicle, symmetry axis of the vehicle, front logo of the vehicle, front camera of the vehicle, front axle of the vehicle.

9. The method according to claim 1, wherein the attitude parameter includes the toe and/or camber at least for rear wheels of the vehicle.

10. The method according to claim 1, comprising a step of the control unit identifying the vehicle, where the step of identifying the vehicle is performed only once, each time the method is run, before the step of deriving the attitude parameter of the vehicle.

11. The method according to claim 1, wherein the reference parameter is representative of a tolerance range for said reference value, and wherein the control unit performs the step of aiding with the positioning only if the step of comparing the attitude parameter with the corresponding reference parameter determines that the attitude parameter of the vehicle is within the tolerance range.

12. A method for calibrating an ADAS sensor of an advanced driver assistance system of a vehicle, wherein the vehicle is positioned in a service area, the method comprising the following steps:
  positioning a first pair of measuring heads on respective front wheels of the vehicle and positioning a second pair of measuring heads on respective rear wheels of the vehicle, where the measuring heads of the first pair and of the second pair of measuring heads each include an emitter and/or a receiver;
  establishing a communication between a control device connected to the a control unit having a processor and the measuring heads of the first pair and second pair of measuring heads;
  deriving an attitude parameter of the vehicle through the control unit using information received from the control device;
  positioning a support structure, on which a calibration device is mounted, near the service area, wherein a step of the measuring heads of the first pair or of the second pair of measuring heads, positioned on the vehicle, detecting corresponding measuring heads, positioned on the support structure, and/or vice versa, is used to provide aid with positioning of the support structure;
  sending a calibration command from the control unit to an electronic control unit of the vehicle to determine an interaction between the ADAS sensor and the calibration device; and
  processing data received from the electronic control unit of the vehicle through the processor of the control unit in order to generate calibration data;
  wherein after said deriving the attitude parameter of the vehicle, the method comprises a step of moving the first pair of measuring heads onto the support structure, wherein the step of aiding with the positioning of the support structure includes communication between the control device and the measuring heads of the first pair of measuring heads mounted on the support structure, and the second pair of measuring heads positioned on the vehicle.

13. The method according to claim 12, wherein, after the step of deriving the attitude parameter of the vehicle, the method includes a step of moving the measuring heads of the first pair of measuring heads onto the support structure, while the second pair of measuring heads remains positioned on the respective rear wheels of the vehicle, wherein the step of providing aid with the positioning of the support structure includes a step of the measuring heads of the first pair of measuring heads, moved onto the support structure, detecting the second pair of measuring heads, mounted on the vehicle, and/or vice versa.

14. The method according to claim 12, wherein the method further comprises a step of generating a report document including the calibration data and one or more values for the attitude parameter of the vehicle.

15. The method according to claim 12, wherein, before the step of deriving the attitude parameter of the vehicle, the method includes a step of positioning the first pair of measuring heads on the respective front wheels of the vehicle and positioning the second pair of measuring heads on the respective rear wheels of the vehicle, where the measuring heads of the first pair and of the second pair of measuring heads each include an emitter and/or a receiver, where in the step of deriving, the attitude parameter is derived by the control unit through communication between the control device, connected to the control unit, and the measuring heads of the first pair and of the second pair of measuring heads.

16. A method for calibrating an ADAS sensor of an advanced driver assistance system of a vehicle, wherein the vehicle is positioned in a service area, the method comprising the following steps:
  deriving an attitude parameter of the vehicle;
  receiving the attitude parameter in a control unit having a processor;
  comparing, through the control unit, the attitude parameter with a corresponding reference parameter representing a reference value for the attitude parameter;
  aiding with positioning, through the control unit which is responsive to the step of comparing the attitude parameter with the reference parameter, of a support structure near the service area, where a calibration device is mounted on the support structure;
  sending a calibration command from the control unit to an electronic control unit of the vehicle to determine an interaction between the ADAS sensor and the calibration device;

processing data received from the electronic control unit of the vehicle through the processor of the control unit in order to generate calibration data, wherein if a deviation between the attitude parameter and the corresponding reference parameter is greater than a predetermined threshold value the control unit will recommend correcting the attitude of the vehicle, until the attitude parameter is within a predetermined range for the attitude parameter, before performing the step of aiding with the positioning of the support structure.

17. The method according to claim 16, wherein the attitude parameter is derived via cameras, wherein the cameras view targets associated with the wheels of the vehicle.

* * * * *